(No Model.)
C. A. COEY.
ATTACHMENT FOR BICYCLES.
No. 535,674. Patented Mar. 12, 1895.
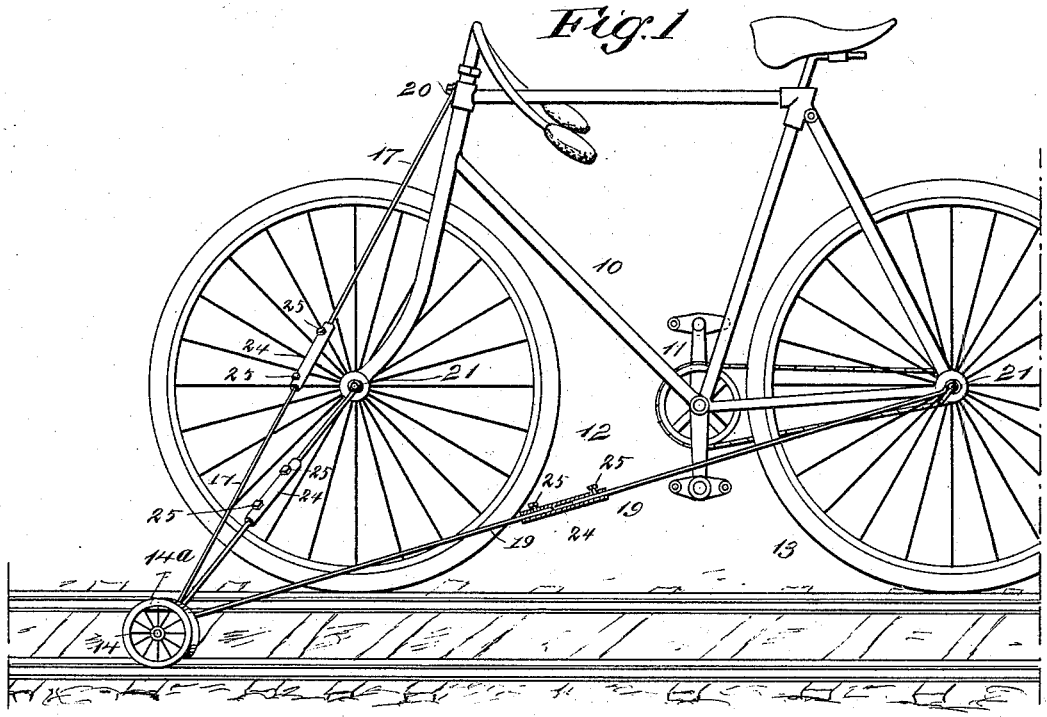
Fig. 1
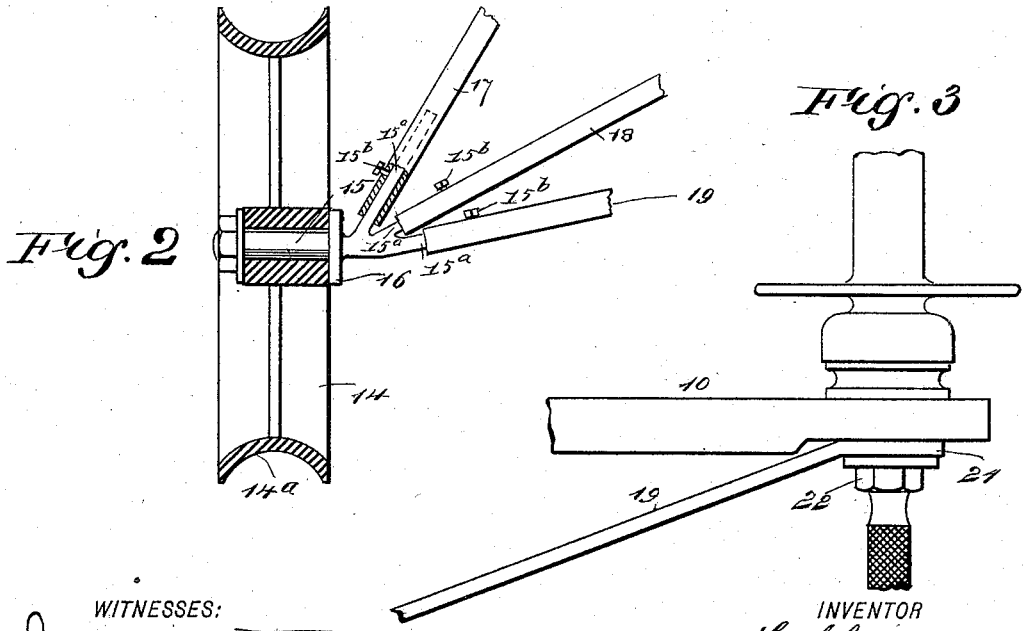
Fig. 2
Fig. 3
WITNESSES:
INVENTOR
C. A. Coey
BY
Munn & Co.
ATTORNEYS.

UNITED STATES PATENT OFFICE.

CHARLES A. COEY, OF FAIRFIELD, WASHINGTON.

ATTACHMENT FOR BICYCLES.

SPECIFICATION forming part of Letters Patent No. 535,674, dated March 12, 1895.

Application filed August 4, 1894. Serial No. 519,464. (No model.)

*To all whom it may concern:*

Be it known that I, CHARLES A. COEY, of Fairfield, in the county of Spokane and State of Washington, have invented certain new and useful Improvements in Attachments for Bicycles, of which the following is a full, clear, and exact description.

My invention relates to improvements in bicycles; and the object of my invention is to produce a device of great simplicity and cheapness, which may be applied to any safety bicycle, and which, when so applied, enables the bicycle to be run with great ease, speed, and safety, even by an inexperienced rider, upon the rails of an ordinary railway track.

A further object of my invention is to produce a device which may be very quickly applied to a bicycle, which when separated from a bicycle may be folded into a very small compass, and which enables the machine to be practically self-steering.

To these ends my invention consists of certain features of construction and combination of parts, which will be hereinafter described and claimed.

Reference is to be had to the accompanying drawings forming a part of this specification, in which similar figures of reference indicate corresponding parts in all the views.

Figure 1 is a perspective view of a bicycle provided with my improved attachments and arranged upon the rails of a railway track. Fig. 2 is an enlarged detail sectional view of the small third wheel which is applied to the machine and shows the connections between the wheel and the braces; and Fig. 3 is an enlarged detail plan view, showing how the braces are applied to the axles of the bicycle.

The bicycle 10 may be of any usual type of safety machine, and it is provided with the customary sprocket wheel driving the gear 11 and with the ordinary front and rear wheels 12 and 13. My improved attachments comprise a small third wheel 14 adapted to run on the rail opposite to that on which the wheels 12 and 13 run, and the connection between the said third wheel and the main machine. This third wheel 14 is provided with the concaved rim 14ª, see Fig. 2, to enable it to hug the rail well, and the axle 15 of the third wheel is provided with a shoulder 16 and has secured to its inner end the braces 17, 18, and 19, the brace 17 extending upward to the steering fork of the machine 10, to which it is fastened by a bolt 20 or equivalent fastening, as shown in Fig. 1, while the brace 18 extends to the axle of the front wheel 12 and the brace 19 to the axle of the rear wheel 13. These braces may be secured in any convenient way, but the best way is to provide each brace 18 or 19 with a terminal washer 21 which fits the adjacent axle of the machine to which it may be secured by means of a nut 22, as shown clearly in Fig. 3.

The connection between the braces 17, 18 and 19 and the axle 15 is such as to permit of the longitudinal adjustment of the braces, as the axle terminates at its inner end in prongs 15ª which enter the hollow ends of the braces, as shown clearly in Fig. 2, and the braces and prongs are held together by set screws 15ᵇ. To further provide for adjusting the braces longitudinally they are each made in two parts, as shown in Fig. 1, and the parts connected by a pipe coupling 24 into which the adjacent ends of the braces extend, and the couplings are held in place by set screws 25.

It will be seen that when the three braces are applied to the machine as stated, they constitute a rigid frame-work, which gives to the machine the necessary stiffness and yet makes it very light, and when placed upon the rails it may be safely run and may be driven with great speed.

As the machine frame and steering fork are connected with the third wheel, it will be seen that no steering is necessary and that all the rider need do is to simply use his strength to propel the machine, and the machine will follow the rails like an ordinary car.

Having thus described my invention, I claim as new and desire to secure by Letters Patent—

1. An attachment for bicycles, comprising a wheel having a concave rim, an axle upon which the wheel is mounted provided with three integral branches on one end, and three sectional and adjustable braces having hollow lower ends to receive the branches of the axle and to which they are adjustably and detachably secured, the other ends of the braces being adapted to be secured to the front and rear axle and the steering fork of a bicycle, substantially as herein shown and described.

2. An attachment for bicycles, comprising a wheel having a concave rim, an axle upon which the wheel is mounted provided with three integral branches and three braces each formed of two parts adjustably connected together by tubular couplings, the ends of the lower sections being hollow to receive the branches of the axle and to which they are detachably and adjustably secured, the upper ends of the braces being adapted to be secured to the front and rear axle and the steering fork of a bicycle, substantially as described.

CHARLES A. COEY.

Witnesses:
F. S. BUBB.
CHARLES P. COEY.